United States Patent [19]
DeKeyser et al.

[11] Patent Number: 5,467,564
[45] Date of Patent: Nov. 21, 1995

[54] DAYLIGHT COLLECTION AND DISTRIBUTION SYSTEM

[75] Inventors: Dawn DeKeyser, Minneapolis; Loren Abraham, White Bear Lake; David A. Eijadi, St. Paul, all of Minn.

[73] Assignee: Andersen Corporation, Bayport, Minn.

[21] Appl. No.: 218,803

[22] Filed: Mar. 28, 1994

Related U.S. Application Data

[63] Continuation-in-part of Ser. No. 69,989, May 28, 1993, Pat. No. 5,408,795.
[51] Int. Cl.⁶ .............................. E04D 13/03; E04B 7/18; G02B 17/00
[52] U.S. Cl. .......................... 52/173.3; 52/200; 126/698; 359/592
[58] Field of Search ...................... 52/169.2, 200, 52/201, 173.3; 126/621, 698; 359/591, 592

[56] References Cited

U.S. PATENT DOCUMENTS

| | | | |
|---|---|---|---|
| 242,059 | 5/1881 | Scott | 52/201 |
| 586,220 | 7/1897 | Basquin . | |
| 586,251 | 7/1897 | Soper . | |
| 1,652,347 | 12/1927 | Champeau . | |
| 2,006,648 | 7/1935 | Nobbs . | |
| 2,097,738 | 11/1937 | Oita . | |
| 2,812,690 | 11/1957 | Boyd . | |
| 2,851,973 | 9/1958 | Stark et al. . | |
| 2,858,734 | 11/1958 | Boyd . | |
| 2,958,259 | 11/1960 | Ewing . | |
| 2,982,054 | 5/1961 | Anderson . | |
| 2,993,409 | 7/1961 | Boyd . | |
| 3,246,564 | 4/1966 | Chieffe . | |
| 3,511,559 | 5/1970 | Foster . | |
| 3,902,794 | 9/1975 | Abrams . | |
| 4,003,365 | 1/1977 | Wiegand et al. . | |
| 4,050,789 | 9/1977 | Herbert . | |
| 4,114,330 | 9/1978 | Sukolics . | |
| 4,143,492 | 3/1979 | Dunn . | |
| 4,296,578 | 10/1981 | Keckman . | |
| 4,329,021 | 5/1982 | Bennett et al. . | |
| 4,344,261 | 8/1982 | Weisner et al. . | |
| 4,351,588 | 9/1982 | Zullig . | |
| 4,428,358 | 1/1984 | Adamson . | |
| 4,509,825 | 4/1985 | Otto et al. . | |
| 4,602,613 | 7/1986 | Barr . | |
| 4,674,244 | 6/1987 | Francovitch . | |
| 4,699,467 | 10/1987 | Bartenbach et al. . | |
| 4,723,386 | 2/1988 | Sandow | 52/200 |
| 4,733,506 | 3/1988 | Gunnarshaug . | |
| 4,809,468 | 3/1989 | Bareiss . | |
| 4,833,838 | 5/1989 | Van Dame . | |
| 4,916,872 | 4/1990 | Young . | |
| 5,027,566 | 7/1991 | Gilowski . | |
| 5,099,622 | 3/1992 | Sutton | 52/200 |
| 5,117,811 | 6/1992 | Taylor . | |
| 5,175,967 | 1/1993 | Greenwood . | |
| 5,199,234 | 4/1993 | Guhl . | |
| 5,204,777 | 4/1993 | Curshod . | |

FOREIGN PATENT DOCUMENTS

| | | | |
|---|---|---|---|
| 2018497 | 4/1970 | Germany . | |
| 249061 | 8/1987 | Germany | 52/201 |
| 4225007 | 2/1994 | Germany . | |
| 1404-610-A | 6/1988 | U.S.S.R. . | |
| 1434-053-A | 10/1988 | U.S.S.R. . | |

Primary Examiner—Carl D. Friedman
Assistant Examiner—Kevin D. Wilkens
Attorney, Agent, or Firm—Merchant, Gould, Smith, Edell, Welter & Schmidt

[57] ABSTRACT

An apparatus designed to capture and direct daylight to a target area in a building or other structure. A housing provides an aperture and passive directing structure which directs daylight entering the apertures towards the target area. The passive directing structure can also direct daylight towards reflecting surfaces in the housing which, in turn, direct the daylight towards the target area.

20 Claims, 7 Drawing Sheets

DAYLIGHT COLLECTION AND DISTRIBUTION SYSTEM

FIELD OF THE INVENTION

This is a continuation-in-part of U.S. patent application Ser. No. 08/069,989, filed May 28, 1993, now U.S. Pat. No. 5,408,795.

The present invention relates to the field of directing daylight towards a target area in a building. More particularly, the present invention relates to an apparatus which efficiently captures and directs daylight toward a target area in the interior of a building.

BACKGROUND OF THE INVENTION

Daylight, as used in connection with the present invention, includes all forms of sunlight whether direct or filtered through clouds or other meteorological phenomena. The amount of daylight available is particularly high on clear, sunny days but is also more than sufficient for interior illumination even on cloudy days when efficient devices are used to transmit daylight into the building.

There are many benefits to using daylight for illuminating areas within enclosed structures such as buildings. The use of daylight over artificial illumination for interior illumination provides a more balanced color rendering of objects which is more aesthetically pleasant and also reduces the need for energy to illuminate the interior of the building artificially. An additional benefit is the reduced amount of radiant energy produced by artificial illumination sources which can, in turn, reduce the amount of cooling needed to maintain a comfortable temperature within a building.

Known systems for transmitting daylight into the interior buildings include skylights and windows. The systems typically sacrifice efficiency or uniform distribution. They are not capable of both efficiently collecting daylight and uniformly transmitting it into the interior of the building. In addition, many of the systems are notorious for heat loss during cool weather and heat gain during warmer weather, both of which are not desired.

Furthermore, the systems typically do not compensate for the position of the sun in the sky and, as a result, transmit varying levels of daylight into the building at different times during each day, as well as differently during each season of the year. In many cases, the amount and quality of light transmitted by the systems is not suitable for interior illumination.

To enhance uniformity of distribution, many skylight designs incorporate diffusing panels or materials which scatter daylight in a disorganized fashion. That disorganized scattering results in illumination which is not particularly sharp.

Attempts have been made to provide more efficient devices for transmitting daylight into the interior of buildings. Solar tracking devices have been used which require mechanical tracking systems to follow the sun's apparent motion across the sky. Such systems are, however, expensive and difficult to maintain, resulting in limited use.

SUMMARY OF THE INVENTION

The present invention addresses many of the problems and disadvantages associated with known systems for transmitting daylight into the interior of a building or other structure.

In one aspect, the present invention provides a passive directing structure in the form of a fresnel lens system which improves the efficiency of the apparatus by directing light toward a target area in the building. The preferred fresnel lens also increases the apparatus' acceptance angle, which also enhances its efficiency.

It is the combination of directing daylight both directly toward target areas and increasing the acceptance angle which provides for the efficient light transmission of the present invention. In the preferred embodiment, the present invention delivers more light, on average, to the target area using a glazing area only half that of a typical diffusing skylight. The result is an effective light gathering and transmitting device which is also energy efficient.

In another aspect, the fresnel lens system used as passive directing structure also directs a portion of the daylight toward reflective surfaces within the apparatus which reflect light toward the target area. The addition of reflected daylight to the directly transmitted daylight and increased acceptance angle only further enhances the efficiency and uniformity of illumination provided by the apparatus.

The preferred embodiments of the present invention also provide optically-sharp illumination as compared to skylights which diffuse the light entering a building. Although the passive directing structure associated with the present invention diverges the daylight striking it, it does so without the disorganized scattering associated with diffusing panels. As a result, the virtual image or images formed by the preferred diverging lenses remain intact which further enhances the balance color rendering associated with daylighting.

The optical properties of the preferred lenses also allow persons inside the building to maintain a visual connection to the sky. In many instances, the preferred apparatus affords the ability to see the sky, sun, clouds, birds flying over and even the moon during nighttime viewing. These optical properties are simply not available with diffusing skylights.

Furthermore, the diverging as opposed to diffusing optical properties of the preferred embodiment of the present invention provide for sharper imaging within the building than is available with light provided by a diffusing-type skylight. The present invention provides that advantage without the associated disadvantage of allowing unaltered direct rays of sunlight to enter the building. The unaltered rays can cause glare due to their intensity and relative lack of divergence (e.g., typical sunlight diverges only approximately ½°). By further diverging the rays entering the building, the glare and other problems associated with unaltered rays are reduced by the present invention.

In yet another aspect, the present invention is provided as a dormer unit which can be mounted on an existing roof to direct daylight into the building through an opening provided in the roof. The preferred dormer incorporates three apertures directed to capture and direct morning, mid-day and late afternoon/evening daylight into the building. To increase the acceptance angle and direct the daylight to a desired target area, each aperture is provided with passive directing structure which, in the preferred embodiment is a compound, diverging radial fresnel lens panel. Other passive directing structure are also contemplated, as discussed below.

The preferred embodiment also includes reflective surfaces in the dormer which reflect daylight toward the target area within the building. The reflective surfaces are placed to cooperate with the passive directing structure in directing the daylight towards the target area.

One advantage of the dormer apparatus is its ability to replace existing skylight systems with the energy efficiency offered by the present invention. The preferred dormer apparatus includes a highly insulated housing (relative to known skylights) to reduce both heat loss during cooler weather and heat gain during warmer weather. Furthermore, the present invention is able to offer those energy-saving advantages while also increasing the light transmitted to the interior of the building.

These and other various advantages and features which characterize the present invention are pointed out with particularity in the claims. However, for a better understanding of the invention and its advantages, reference should be had to the drawings which form a further part hereof and to the accompanying descriptive matter in which preferred embodiments of the invention are illustrated and described.

DETAILED DESCRIPTION OF THE PREFERRED AND ALTERNATE EMBODIMENTS

The present invention comprises an apparatus designed to capture and direct daylight to a target area in a building or other structure. To do so, the present invention comprises a housing with a plurality of apertures and passive directing structure which directs daylight entering the apertures towards the target area. In one preferred embodiment, the passive directing structure also directs daylight towards reflecting surfaces in the housing which, in turn, direct the daylight towards the target area.

As described with respect to the present invention, the target area is generally located below the apparatus 10. It will be understood that the size and shape of the target area can vary depending on a number of factors including, but not limited to, the angle at which light strikes the apparatus 10, the design of the apparatus 10 and its elevation above the target area.

Figure 1:
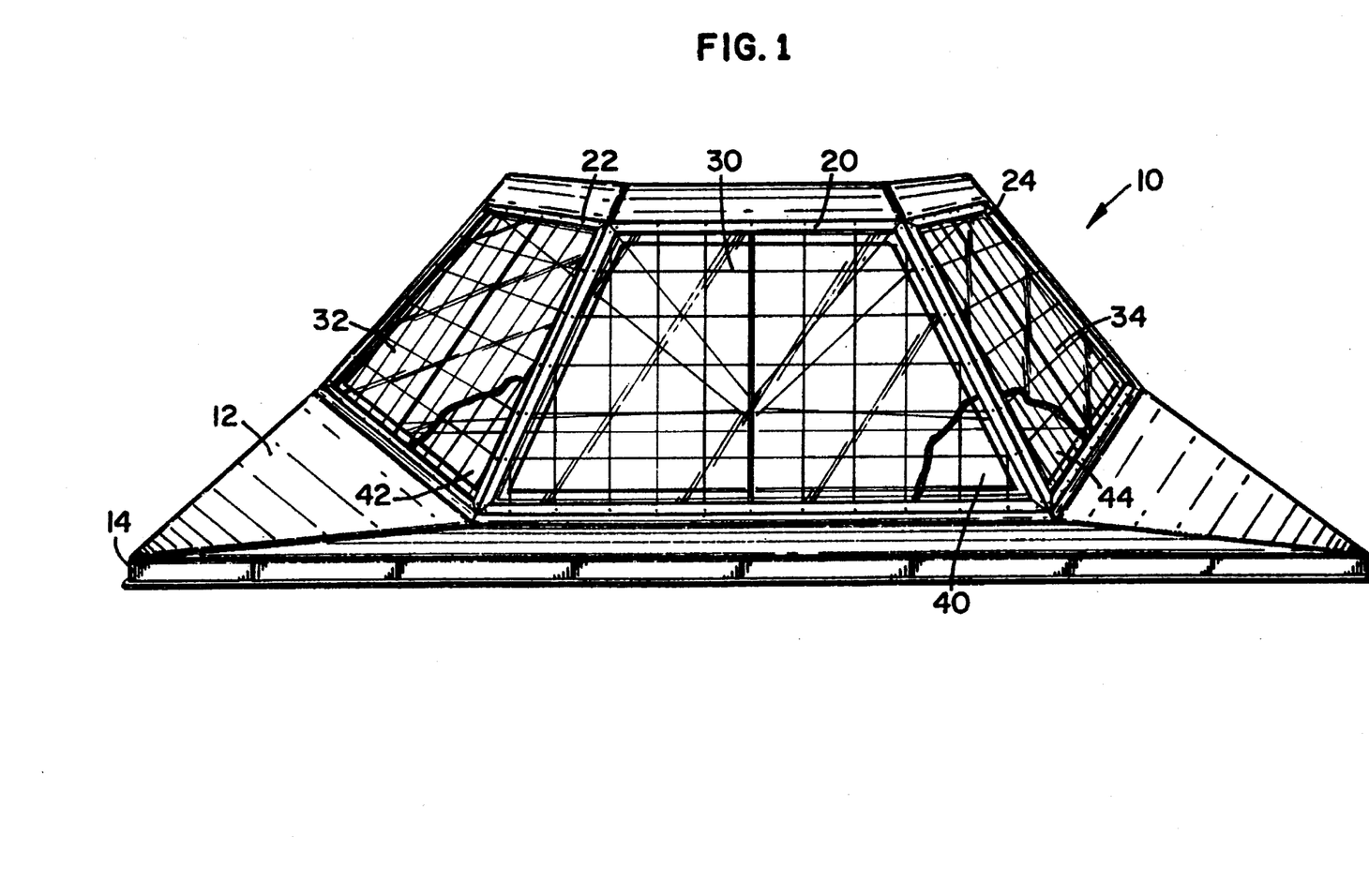
FIG. 1 is a frontal perspective view of one embodiment of the apparatus according to the present invention.

FIG. 1 is a perspective view of one preferred embodiment of an apparatus 10 according to the present invention. As shown there, the apparatus 10 includes a housing 12 and apertures 20, 22 & 24 which contain glazing panels 30, 32 and 34. Portions of the glazing panels 30, 32 and 34 are shown partially removed for clarity.

The apparatus 10 according to the present invention is designed to be placed on the roof of a structure and, as such, must protect any opening into the structure from rain, snow or other unwanted elements. The housing 12 preferably includes an integral curb 14 formed around its perimeter which is designed to mate with an opening formed in a building or other structure.

The apparatus 10 depicted in FIG. 1 is designed for use on flat roofs. Essentially the apparatus 10 forms a dormer which is used to admit daylight into the structure. The function of the housing 12 is to seal the opening into the building from the elements as well as to hold glazing panels 30, 32 and 34 in their proper relationship to the sun. It will be understood that other dormer shapes and designs could be substituted if the roof is not flat or if a different shape is desired for the dormer.

The glazing panels 30, 32 and 34 can be of many different varieties including single, double or triple glazing. The glazing can also be insulated if desired. In all of the embodiments, the glazing is preferably clear to admit as much daylight as possible into each of the apertures 20, 22 and 24.

Located directly behind the glazing panels 30, 32 & 34 in the apparatus 10 are the passive directing structure provided to direct daylight entering the apertures 20, 22 & 24 to the target area. In the preferred embodiment pictured in FIG. 1, the passive directing structure comprises a compound diverging radial fresnel lens panel 40, 42 and 44 in each of the apertures 20, 22 & 24. The preferred lens panels 40, 42 & 44 include an array of radial fresnel lenses forming a lens panel sized to fit the appropriate aperture 20, 22 & 24 in the apparatus 10.

The lens panels 40, 42 & 44 are preferably mounted in close proximity to the interior surface of the glazing panels 30, 32 & 34. The edges of the lens panels 40, 42 & 44 are mounted on the housing 12 using moldings and/or mechanical fasteners which provide a gap around the perimeter of the panels 40, 42 & 44. The gap limits condensation and heat buildup between the lens panels and glazing panels by providing for air movement between the two panels. In the preferred embodiment, the mounting hardware also allows for expansion and contraction of the lens panels 40, 42 and 44.

Figure 2:
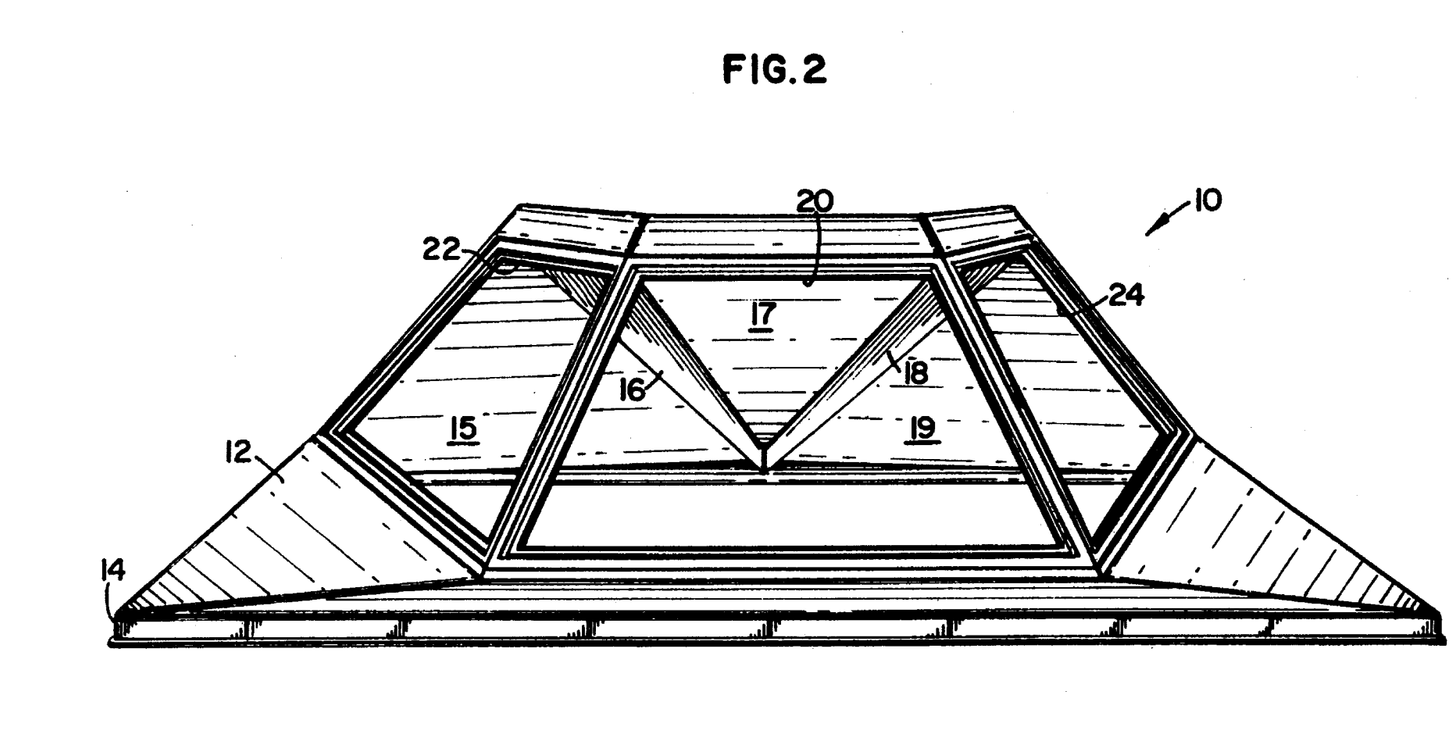
FIG. 2 depicts the apparatus of FIG. 1, with the glazing panels and lens panels removed to expose the interior of the apparatus.

The preferred lens panels 40, 42 & 44 preferably direct a portion of daylight entering each aperture downward toward the target area in the building on which apparatus 10 is installed. In addition, the lens panels 40, 42 & 44 also direct a portion of the daylight entering the apertures towards one or more of the reflective surfaces 15-19 in the housing 12. Those reflective surfaces are best seen in FIG. 2, in which the lens panels 40, 42 and 44 are removed for clarity. The reflective surfaces 15-19 are preferably oriented to direct daylight striking them downward into the building at a desired target area.

Although the preferred embodiment incorporates compound diverging radial fresnel lens panels, it will be understood that many other different types of passive directing structure could be provided. One alternative could include a linear fresnel lens panel which also provides a diverging light pattern directed inward toward the target area of the building. Another alternative is a pair of linear fresnel lenses in which the striations cross each other (i.e., are not parallel). That alternative can be used to simulate the divergence pattern of the preferred radial fresnel lenses. Additionally, an array of independent diverging lenses (non-fresnel) mounted appropriately in each aperture in the housing 12 could be used to provide the passive directing structure of the present invention. Other alternatives will be known to those skilled in the art of providing optical systems.

Whatever form the passive directing structure takes, it should perform two functions which enhance the advantages of the present invention. The first function is to direct daylight entering the apertures directly towards the target area. The second function is to increase the acceptance angle for daylight entering the apertures 20, 22 & 24. In addition, in the preferred embodiments the passive directing structure also directs a portion of daylight towards any reflecting surfaces provided in the housing 12 for reflection towards the target area.

The preferred lens panels 40, 42 & 44 provide an acceptance angle of plus or minus 30° off of their normal axes. The importance of acceptance angle is discussed more fully below. Briefly though, acceptance angle can be used to increase the light gathering capabilities of the apparatus 10 by accepting light from the sun at different times of the year when the sun is either at its highest point during summer solstice or it lowest point during the winter solstice (in the northern hemisphere).

The lens panels 40, 42 and 44 and/or the glazing panels 30, 32 and 34 can also incorporate diffusing means to at least partially disperse daylight after it enters the apertures in the housing 12. In the preferred embodiment, the diffusing means would be located on the planar surface of the fresnel lens panels, although a separate diffusing element could be added to the apparatus 10. Examples of other possible diffusing means include stippling or forward scattering films similar to those found in overhead projectors and other optical devices. In the preferred embodiments, the diffusing means will not completely diffuse the daylight entering the apertures, but will rather soften it and leave the virtual image formed by the diverging lenses intact, if slightly less sharp. Alternately, the diffusing means can provide complete diffusing, although such action may decrease the light transmission to the target area.

The preferred radial fresnel lens panels 40, 42 & 44 do not, however, include any means for diffusing the daylight entering the apertures 20, 22 & 24. Rather, the reflective surfaces 15–19 are preferably supplied with a reflective coating which causes light to diverge after striking them. In other words, the preferred reflective surfaces 15–19 do not provide a specular reflective surface.

The preferred reflective coating is available from 3M Company, St. Paul, Minn., under the trade name DAY-LIGHTING FILM. It comprises a composite laminate having a linear fresnel lens bonded to a reflective layer and backed by a thin layer of plexiglass or other stiffening material to protect the reflective layer. The linear striations in the fresnel lens diverge light striking the reflecting layer approximately 10°.

Alternatively, the reflective surfaces 15–19 can be provided with a finished white surface which is designed to reflect and diffuse a majority of the light striking the surfaces toward the target area within the building. Other alternate reflecting means, both specular and non-specular, will be known to those skilled in the art and can be substituted for those described above.

Figure 3:
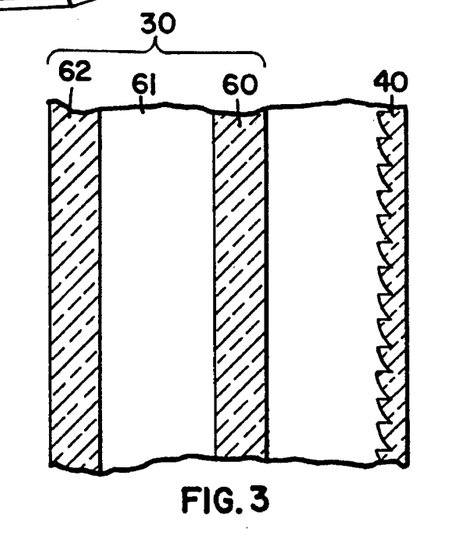
FIG. 3 is a cross-section of the glazing according to the preferred embodiment according to the present invention.

FIG. 3 depicts a cross-section of one of the preferred glazing panels 30 and a preferred lens panel 40 according to the present invention. As shown there, the preferred glazing includes two panes of glass 60 and 62 separated by a confined air gap 61. This double glazing panel 30 is mounted in aperture 20 in the housing 12. As discussed above, it will be understood that single or triple pane glazing could be substituted in place of the preferred double glazing. Furthermore, the air gap 61 could be evacuated and replaced with an inert gas to further enhance the insulative qualities of the glazing panel 30.

In the preferred embodiment, the lens panel 40 is mounted on the inside of the apparatus 10. By providing the lens panel 40 on the interior of the apparatus 10, it is protected from the elements, as well as dirt and debris which could degrade the performance of the lens system.

Other combinations of the glazing system and passive directing structure are also contemplated. In particular, the lens panel 40 could be placed in between two separate glazing panels or the lens panel 40 itself could serve as the glazing covering aperture 20. Furthermore, the lens panel 40 could be incorporated into an insulated glazing system. A variety of combinations of the above could be used to provide the necessary glazing as well as the passive directing structure for daylight according to the present invention.

Figures 4, 6:
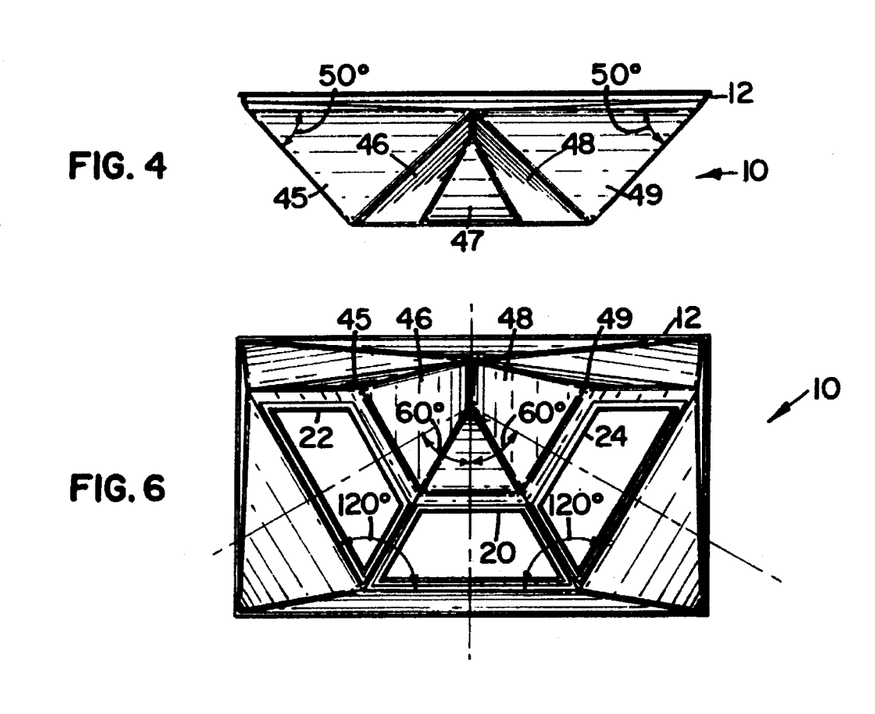
FIG. 4 is a rear elevational view of the apparatus of FIG. 1.
FIG. 6 is a top plan view of the apparatus of FIG. 1.

Referring now to FIG. 4, it can be seen that the rear of the housing 12 includes surfaces 45, 46, 47, 48, and 49 which correspond to the reflective surfaces 15, 16, 17, 18 and 19 in the interior of the apparatus 10. The preferred shape of the apparatus 10 directs rainfall, snow and other precipitation off of the apparatus 10 without entering the building on which the apparatus is installed. As such, the surfaces are sloped to provide for proper drainage. It will, however, be understood that the rear of the housing 10 could take many shapes to accomplish that purpose.

Figure 5:
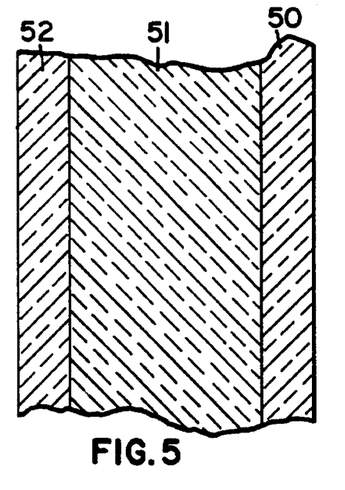
FIG. 5 is a cross-section of the housing of the preferred embodiment according to the present invention.

Referring now to FIG. 5, wherein a cross-section of the preferred housing of the preferred embodiment is depicted, it is seen that the preferred housing 12 includes an inner shell 50 and an outer shell 52. In the preferred embodiment both the inner and outer shells 50 and 52 are formed of a molded fiberglass composite which will be well known to those in the art.

The inner and outer shells 50 and 52 are supported by bracing where necessary to provide structural integrity to the apparatus 10. A layer of insulation 51 is also preferably provided between the inner and outer shells 50 and 52 to reduce heat loss during cooler weather and also reduce heat gain during warmer weather through the housing 12 of the apparatus 10. It will, of course, be understood that the materials and methods of constructing the housing 12 could vary widely. The function of the housing 12 is to maintain the apertures, passive directing structure and reflecting surfaces (if necessary) in their proper orientation with respect to the sun and the target area inside the building. As such, variations in the housing construction could be expected based on available materials and costs of construction.

Having described the construction of the housing and other portions of the apparatus 10, the discussion will now focus on the desired spatial relationships provided in the apparatus 10.

As depicted in FIGS. 1 and 6, the preferred apparatus 10 includes three apertures 20, 22 and 24. When apparatus 10 is installed on a building, aperture 20 is preferably aligned to face celestial meridian at the location in which it is installed. Celestial meridian is defined as the direction, east to west, at which the sun rises to its highest position at any given time during the year.

The side apertures 22 and 24 preferably face directions which lie 60° to the left and right, respectively, from the direction faced by aperture 20. As a result, apertures 22 and 24 form a 120° angle with the front aperture 20 as depicted in FIG. 6. Other angles between the directions faced by the side apertures 22 and 24 and front aperture 20 are contemplated, although angles shallower than about 45° would be suitable in only a small portion of the world and, likewise, angles greater than 90° would provide the desired lighting characteristics in a different small portion of the world.

The side apertures 22 and 24 are provided to direct daylight toward the target area when the sun is either in the morning sky or late afternoon/evening sky. As such, the exact angle between the front aperture 20 and either of the side apertures 22 or 24 could be varied to provide either more or less light at either end of a day as desired by the user. Furthermore, it will be understood that the preferred angle could change at various times of the year as the sun rises and sets farther toward the southern horizon during the winter solstice and rises farther northward as the year approaches the summer solstice (in the northern hemisphere).

A second variable which can change depending on the location and light needs of the user is the inclination of each aperture and associated lens system. In the preferred embodiment, the front aperture 20 and associated preferred lens panel 40 would be located at an angle of 40° off of horizontal at a majority of latitudes in the northern or southern hemisphere.

That inclination can be adjusted, however, to favor the entrance of light during either the winter or summer, as well as according to the latitude at the location of installation. In other words, at higher latitudes the inclination of the panel may preferably be greater than 40° to enhance the ability of the apparatus 10 to capture and direct sunlight into a building.

The side apertures 22 and 24 are most preferably inclined at an angle of 60° off of horizontal to compensate for the lower position of the sun in the sky as it approaches the extremes of sunrise and sunset. That inclination can also be adjusted for location as discussed with respect to the front aperture 20.

Figure 7:
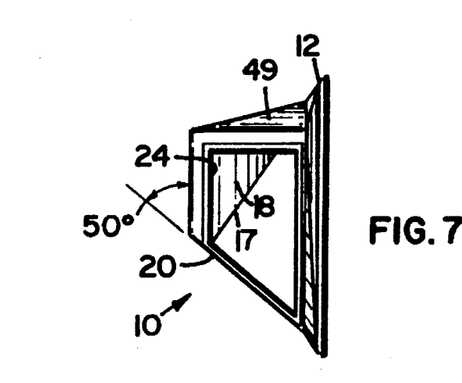
FIG. 7 a side view of the apparatus if FIG. 1.

In the preferred embodiment, however, the angles of inclination for each aperture 20, 22 & 24 are the same to simplify construction of the apparatus 10 as well as for aesthetic reasons in the design of the apparatus 10. The compromise inclination angle in the apparatus 10 is 50° as seen in FIGS. 4 and 7 although other angles of inclination could be substituted.

In part, the inclination of the apertures 20, 22 and 24 is also a function of the acceptance angle of the passive directing structure used in the apparatus 10. As discussed above, the preferred passive directing structure is a compound diverging radial fresnel lens system with an acceptance angle of ±30°. Other lens systems having differing acceptance angles may require adjustment in the inclination of each aperture to provide for the best results. Such changes will typically, however, require experimentation to determine optimal values, although optics software can be used to model the various options available to a designer.

Figure 8:
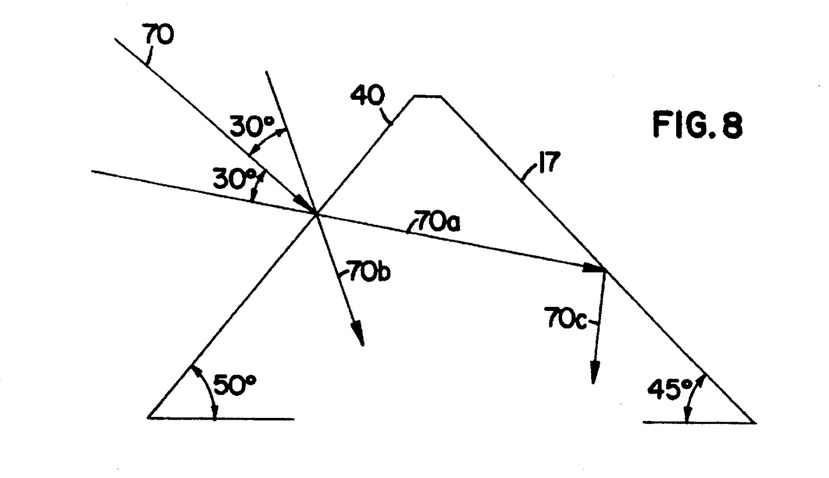
FIG. 8 is a schematic diagram of the interaction of light with the preferred passive directing structure and a reflecting surface according to the present invention.

FIG. 8 is a two-dimensional schematic diagram showing the relationship between a lens panel 40 of the preferred embodiment and a reflecting surface 17 located directly behind lens panel 40. Although FIG. 8 depicts only two dimensions for clarity and simplicity, it will be understood that the preferred radial fresnel lenses operate in three dimensions.

As described above, the preferred lens panel 40 has an acceptance angle of ±30° from a normal axis. Light 70 striking lens panel 40 diverges into two beams 70a and 70b. Beam 70b is directed downward toward the target area in the structure and 70a is directed toward the reflecting surface 17. Light 70a strikes reflecting surface 17 and is reflected toward the target area as light 70c.

In actual practice, some of the light 70a is also reflected back out through lens panel 40 although it is preferable to minimize those reflections to enhance the efficiency of the apparatus 10.

In the preferred embodiment, the inclination angle of the reflecting surface 17 off of horizontal is preferably 45°. The same angle is also used for reflecting surfaces 16 & 18 as well. It will, however, be understood that the reflecting surface angle is dependent upon the angle of inclination of the passive directing structure, the angle at which light exits the passive directing structure, and the shape and size of the target area toward which light is being directed. If, for example, the target area is large, the inclination of one or more of the reflecting surfaces 16–18 may be decreased to provide for a wider dispersion of incoming light. Alternatively, the reflecting surfaces may be inclined on a more vertical plane if the target area for light is smaller.

Furthermore, although the reflecting surfaces 16, 17, 18 (which combine to form an inverted pyramidal shape in the apparatus 10) enhance the illumination characteristics of the preferred embodiment including the radial fresnel lens panels 40, 42 & 44, those reflecting surfaces 16–18 may be eliminated if the passive directing structure itself includes diffusing means as discussed above.

If a diffusing means were provided, for example, with the preferred linear fresnel lens system, the apparatus 10 may not require reflecting surfaces 16–18 within the housing 12. Such reflecting surfaces may, however, be retained aesthetic reasons as well as for any improvement in the ability of the apparatus 10 to illuminate a given target area which they provide.

Although the preferred embodiment of the present invention described above includes substantially flat surfaces and linear geometries, it will be understood that housings used to provide apertures could take many shapes. In particular, one alternate housing could take the shape of a portion of a sphere (e.g., hemispherical). A hemispherical shape would provide for placement of the apertures at any location around the circumference of the base of the housing, as well as at any inclination necessary at a given latitude to provide optimal performance.

Figure 9:
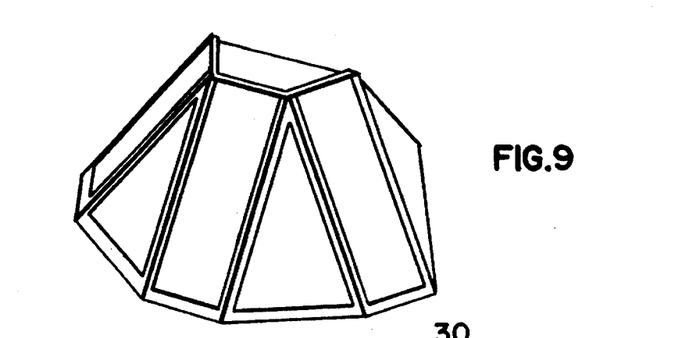
FIG. 9 is a perspective view of an alternate embodiment of an apparatus according to the present invention.

Furthermore, many other housing designs are contemplated for use according to the present invention. Another example of an alternate design is depicted in FIG. 9. As shown there, the housing can include any number of apertures, to optimize the capture and transmission of daylight at the desired times of the day and/or year.

Figure 10:
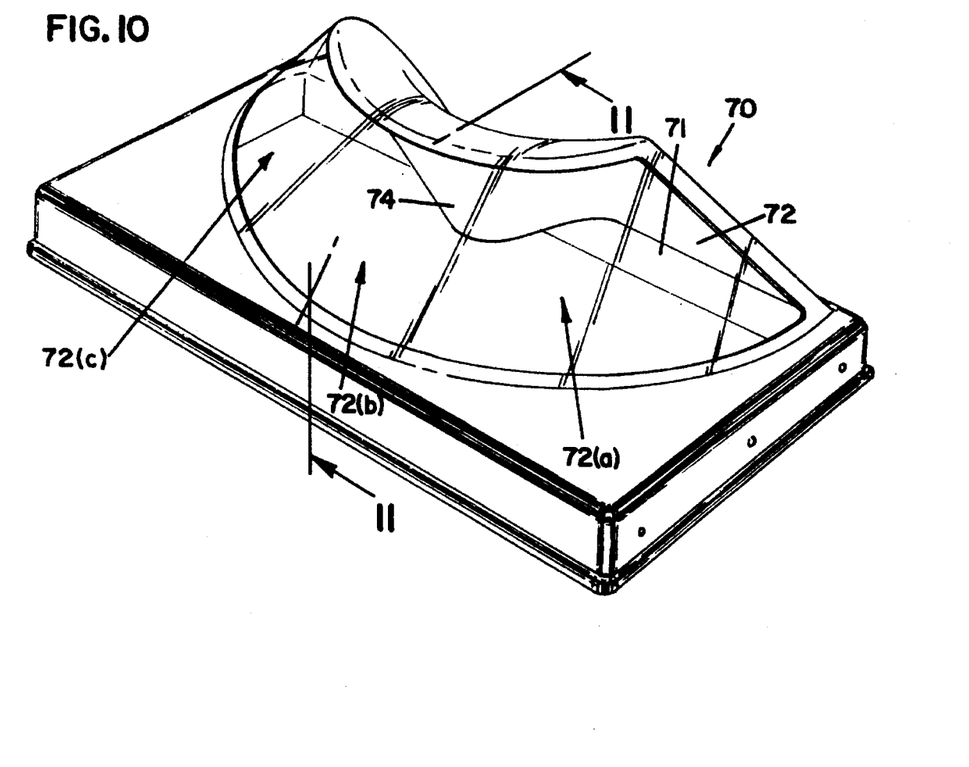
FIG. 10 perspective view of an alternate preferred embodiment of an apparatus according to the present invention.
Figure 11:
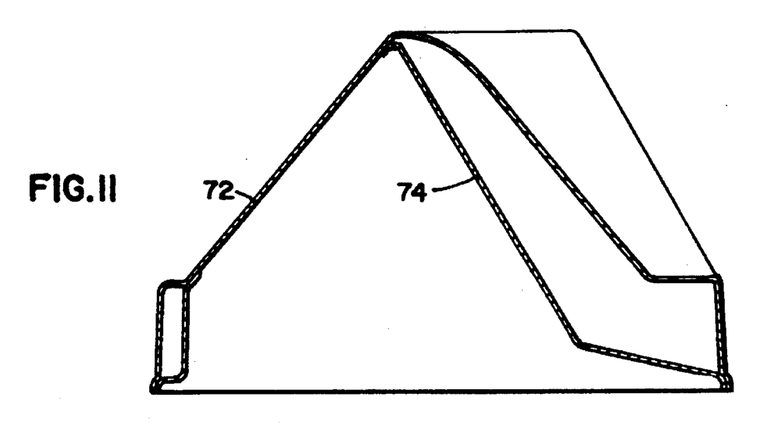
FIG. 11 is a cross section of the housing of an alternate preferred embodiment according to the present invention.

FIGS. 10 and 11 depict an alternative preferred embodiment 70 of the present invention. As is apparent, there is a single aperture 71, rather than a plurality of apertures. It has been found that all the benefits described with multiple apertures may be achieved through a single aperture 71, which is curved, thus achieving the same results as a plurality of apertures. The present embodiment is preferred due to ease of manufacturing, reduced, costs, and minimal glazing. A single lens is glazed only along the exterior opening of the housing, thus, there is no additional mullion, as was present in the multi-aperture structure.

The exterior glazing panel 72 is preferably curved in a manner such that it makes the angles described earlier possible, but also adds numerous other angles. Located behind the glazing panel 72, is the passive directing means (shown in FIGS. 13 and 14) which directs daylight entering the aperture 71, to the target area.

FIG. 11, is a cross sectional view of FIG. 10. As is evident, the panel 72, and reflective surface 74, are shown. Although it is not shown in FIG. 11, a lens panel, such as that shown in FIG. 13 as 75, would be adjacent, or preferably secured to glazing panel 72, as shown in FIG. 14.

Furthermore, the angles and the directions of which the different portions (72(a), 72(b), and 72(c)) of the single aperture are also the same as described previously herein. Thus each portion may face a direction which is akin to each of the apertures described earlier facing a direction.

Referring to FIGS. 10 and 11, it can be seen that 74 is a reflective surface. Preferably, this reflective surface is a high gloss surface. A preferred high gloss surface is a solid white surface, but other high gloss surfaces are envisioned. Such a reflective surface provides light to be directed down towards the target area as described earlier.

Figure 12:
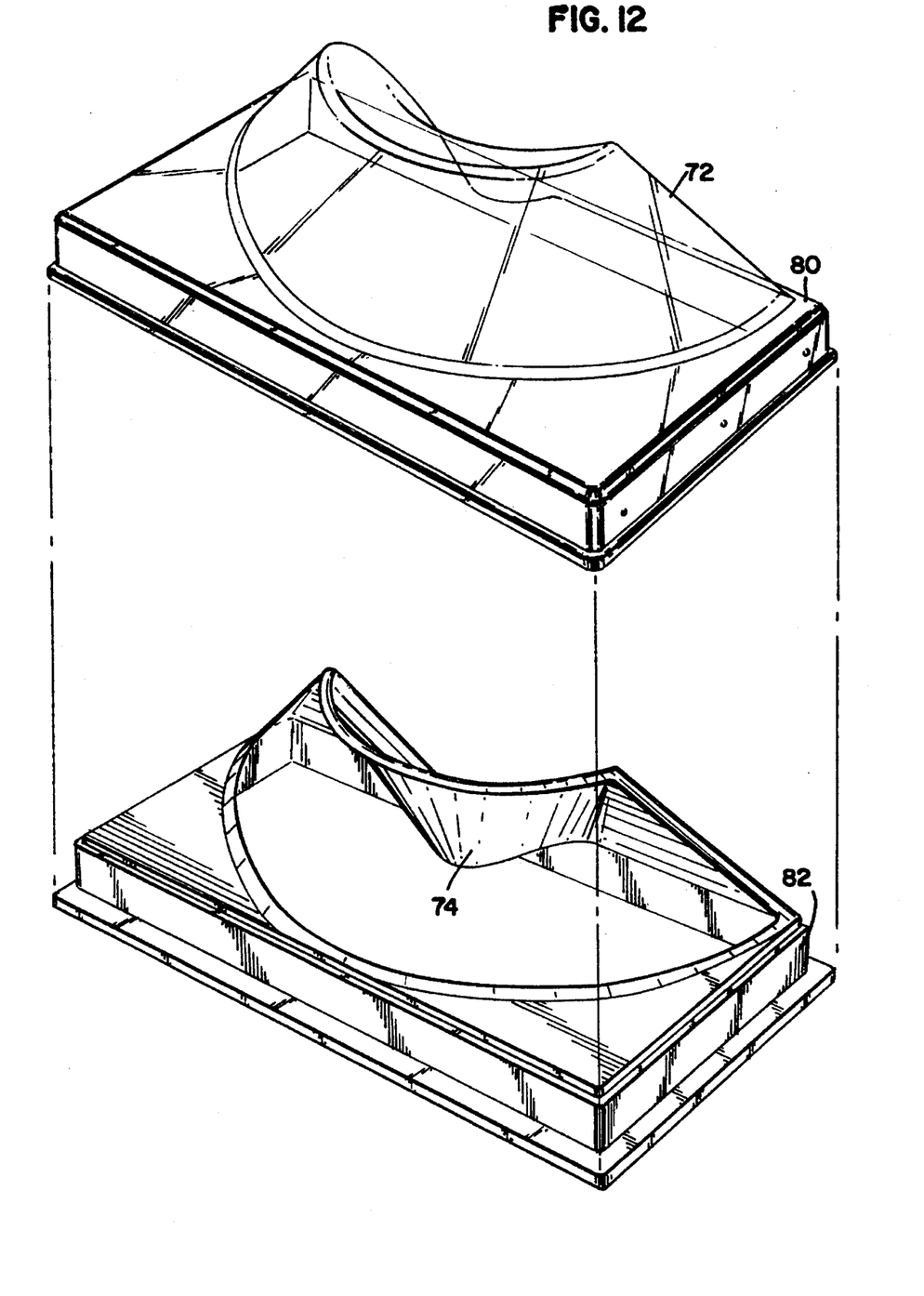
FIG. 12 is an exploded view of two halves of the housing of FIG. 10.

As can be seen in FIG. 12, as well as in FIG. 11, it is preferred to construct a housing with two halves, 80 and 82. 80 includes the opening for the glazing panel 72 and is formed as a single unitary structure. The bottom half 82, includes the reflective surface 74. Preferably, the two housing halves are vacuum formed out of a thermoplastic material. The aperture 71, is cut out from both halves, the halves are mated, and a glazing panel as described earlier is used to seal opening 71.

Figure 13:
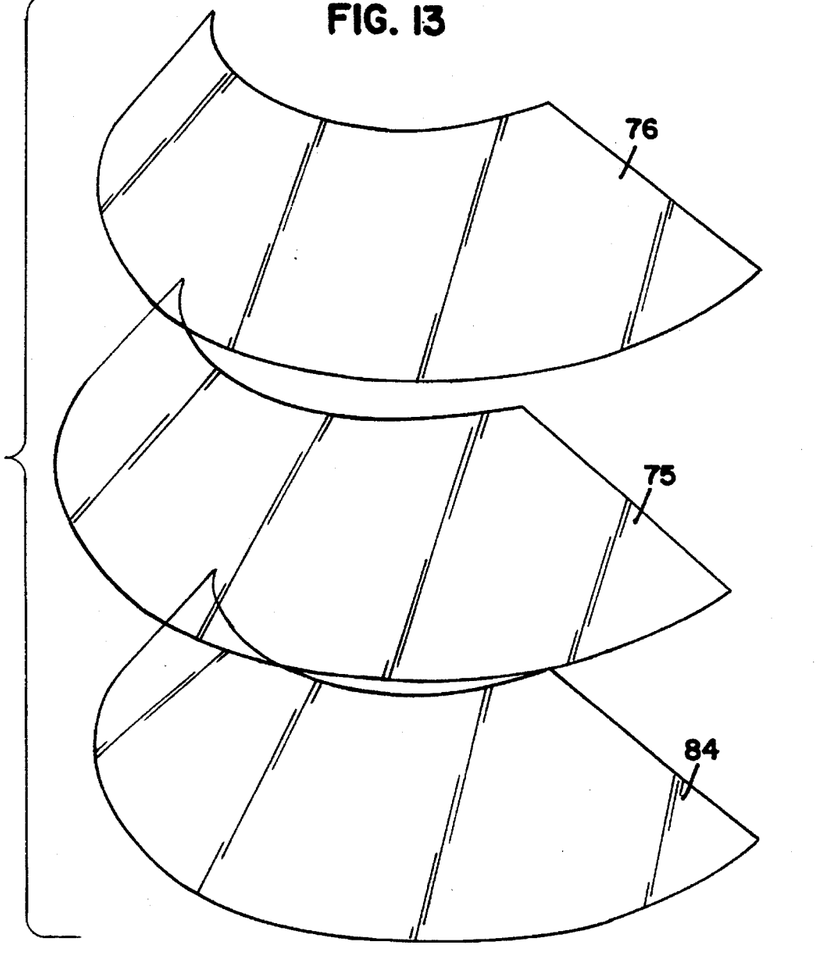
FIG. 13 is an exploded view of the glazing panel of FIG. 14.
Figure 14:
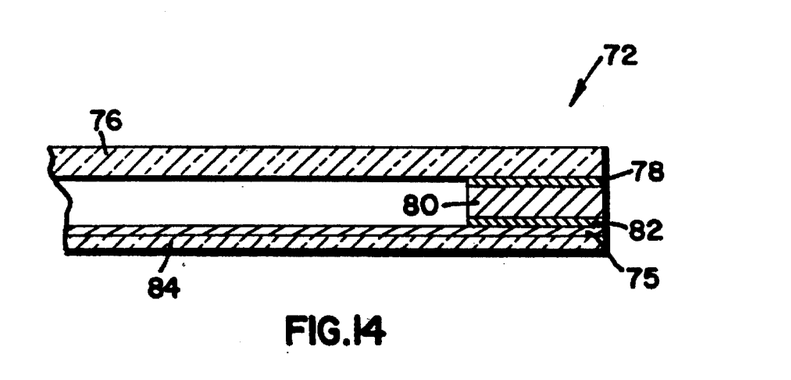
FIG. 14 is a cross section of a glazing panel of the present invention.

In the preferred embodiment, as shown in FIGS. 13 and 14, the passive directing means comprises a diverging, radial, fresnel lens panel 75. A preferred lens panel comprises an array of radial fresnel lenses forming a lens panel sized to fit the appropriate aperture 71 in the apparatus 70. The lens panel 75 is flexible, such that it may be curved to fit the curve of acrylic panel 76.

As is shown in FIG. 14, the glazing panel 72 can be a composite structure. Preferably, it has an outer glazing 76 which is a clear acrylic material. 78 is a high bond tape, commercially available from 3M. Preferably, the tape is Scotch brand VHB tape. It is a double coated acrylic foam tape. 80 is a spacer, which again is an acrylic material. 82 is the VHB tape described as 78. Layer 84 is an additional one sided tape which adheres the lens 75 to the acrylic composition. Preferably, 75 is a diverging radial fresnel lens. It has also been found that preferably 76 has a matte finish rather than a gloss finish which eliminates ring patterns from the lens or the target surfaces. In the construction of the glazing of the present invention, the composite structure shown in FIG. 14 is manufactured, cut, and bent into opening 71. It is thereafter glazed around the perimeters of the opening in housing 70.

The composite panel can take a number of configurations, it can be bent glazing, to mimic a three aperture system, such as that shown and disclosed in FIG. 1, or it can be a curved glazing, as shown in FIG. 10

It is to be understood that even though numerous characteristics and advantages of the present invention have been set forth in the foregoing description, together with details of one preferred apparatus used to practice the present invention, the disclosure is illustrative only, and changes may be made in details, especially in matters of details which fall within the principles of the invention to the full extent indicated by the broad, general meaning of the terms in which the appended claims are expressed.

We claim:

1. An apparatus for directing daylight towards a target area in a building, said apparatus comprising:
    a) a housing;
    b) a curved aperture in said housing, said aperture arranged to face in at least a first and second direction towards the horizon; and
    c) passive directing structure for: 1) directing daylight entering said aperture toward said target area, and 2) increasing the angle of acceptance through which daylight entering said aperture is directed towards said target area, wherein said passive directing structure is located proximate said aperture.

2. The apparatus of claim 1 wherein said aperture is arranged such that a first portion of said aperture is substantially facing the celestial meridian, and a second portion of said aperture is substantially faced towards a direction chosen from the group consisting of sunrise or sunset.

3. The apparatus of claim 2 wherein said apparatus comprises a third portion substantially facing the horizon, whereby said housing is oriented such that said first portion is substantially facing the celestial meridian, said second portion is substantially facing toward the direction of sunrise and said third portion is substantially facing toward the direction of sunset.

4. The apparatus of claim 2, wherein said direction faced by said second portion is at least approximately 45 degrees offset from said direction faced by said first portion.

5. The apparatus of claim 2, wherein said direction faced by said second portion is approximately 60 degrees offset from said direction faced by said first portion.

6. The apparatus of claim 2, wherein said direction faced by said second portion is approximately 90 degrees offset from said direction faced by said first portion.

7. The apparatus of claim 1, wherein said passive directing structure further comprises a diverging lens.

8. The apparatus of claim 1, wherein said passive directing structure further comprises a diverging fresnel lens.

9. The apparatus of claim 1, wherein said passive directing means further comprises a diverging linear fresnel lens.

10. The apparatus of claim 1, wherein said passive directing structure further provides a non-diffusing interface.

11. The apparatus of claim 1, wherein said aperture includes first and second portions arranged to respectively face in said first and second directions, the apparatus further comprising first and second reflecting surfaces respectively oriented to reflect daylight entering said first and second portions towards said target area.

12. The apparatus of claim 11, wherein said first and second reflecting surfaces have a non-specular reflecting finish.

13. The apparatus of claim 12, wherein said non-specular reflecting finish comprises a white finish.

14. The apparatus of claim 12, wherein said non-specular reflecting finish comprises a reflective laminate comprising a fresnel lens panel.

15. The apparatus of claim 1, wherein said passive directing structure has an acceptance angle and further wherein said passive directing structure defines a normal axis, said normal axis inclined from a horizontal plane sufficient to accept direct light from the sun at both the winter solstice and the summer solstice as defined by a latitude for which the apparatus is designed for installation.

16. The apparatus of claim 1, wherein said aperture includes first and second portions arranged to respectively face in said first and second directions, wherein said passive directing structure also includes first and second portions respectively located substantially within said first and second portions, wherein said first portion of said passive directing structure defines a first normal axis, said first normal axis inclined approximately 40 degrees from a horizontal plane, and further wherein said second portion Of said passive directing means defines a second normal axis, said second normal axis inclined approximately 60 degrees from said horizontal plane.

17. The apparatus of claim 1, wherein said passive directing structure defines a normal axis, said normal axis inclined approximately 50 degrees from a horizontal plane.

18. The apparatus of claim 1, wherein said housing is formed of a molded shell incorporating an insulating material.

19. An apparatus for directing daylight towards a target area in a building, said apparatus comprising:

a) a housing;

b) an aperture in said housing, said aperture having first and second portions respectively arranged to face in first and second directions towards the horizon; and c) passive directing structure for: 1) directing daylight entering said aperture toward said target area, and 2) increasing the angle of acceptance through which daylight entering said aperture is directed towards said target area, wherein said passive directing structure is located proximate said aperture.

20. An apparatus for directing daylight towards a target area in a building, said apparatus comprising:

a) a housing;

b) an aperture in said housing arranged to face in a first direction towards the horizon;

c) passive directing structure, located proximate said aperture, for: 1) directing daylight entering said aperture towards said target area, and 2) increasing the angle of acceptance through which daylight entering said aperture is directed towards said target area; and d) a reflecting surface oriented to reflect daylight entering said aperture towards said target area, said reflecting surface having a non-specular reflecting finish and comprising a reflective laminate having a fresnel lens panel.

* * * * *

UNITED STATES PATENT AND TRADEMARK OFFICE
CERTIFICATE OF CORRECTION

PATENT NO. : 5,467,564
DATED : November 21, 1995
INVENTOR(S) : Dawn Dekeyser, et. al.

It is certified that error appears in the above-indentified patent and that said Letters Patent is hereby corrected as shown below:

Column 3, line 39, insert --is a -- after the word "Fig. 10".--.
Column 8, line 40, insert --for--after the word "retained".--.
Column 9, line 11, delete-- "cross sectional" and substitute therefore --cross-sectional--.
Column 11, line 10, delete "Of" and substitute therefore --of--.

Signed and Sealed this

Ninth Day of April, 1996

Attest:

BRUCE LEHMAN

*Attesting Officer*  *Commissioner of Patents and Trademarks*